United States Patent
Koll et al.

(10) Patent No.: US 9,082,310 B2
(45) Date of Patent: Jul. 14, 2015

(54) PROVIDING COMPUTABLE GUIDANCE TO RELEVANT EVIDENCE IN QUESTION-ANSWERING SYSTEMS

(75) Inventors: Detlef Koll, Pittsburgh, PA (US); Thomas Polzin, Pittsburgh, PA (US)

(73) Assignee: MModal IP LLC, Franklin, TN (US)

( * ) Notice: Subject to any disclaimer, the term of this patent is extended or adjusted under 35 U.S.C. 154(b) by 0 days.

(21) Appl. No.: 13/025,051

(22) Filed: Feb. 10, 2011

(65) Prior Publication Data

US 2012/0041950 A1  Feb. 16, 2012

Related U.S. Application Data

(60) Provisional application No. 61/303,242, filed on Feb. 10, 2010.

(51) Int. Cl.
*G06F 17/30* (2006.01)
*G09B 7/02* (2006.01)
*G06F 9/44* (2006.01)

(52) U.S. Cl.
CPC .............. *G09B 7/02* (2013.01); *G06F 9/4446* (2013.01); *G06F 17/30976* (2013.01)

(58) Field of Classification Search
None
See application file for complete search history.

(56) References Cited

U.S. PATENT DOCUMENTS

| | | | |
|---|---|---|---|
| 5,933,809 A | 8/1999 | Hunt et al. | |
| 6,292,771 B1 | 9/2001 | Haug | |
| 6,655,583 B2 | 12/2003 | Walsh et al. | |
| 7,233,938 B2 | 6/2007 | Carus | |
| 7,290,016 B2 | 10/2007 | Byers | |
| 7,447,988 B2 | 11/2008 | Ross | |
| 7,454,393 B2 | 11/2008 | Horvitz | |
| 7,467,094 B2 | 12/2008 | Rosenfeld et al. | |
| 7,516,113 B2 | 4/2009 | Horvitz et al. | |
| 7,584,103 B2 | 9/2009 | Fritsch | |
| 7,610,192 B1 | 10/2009 | Jamieson | |
| 7,693,727 B2 | 4/2010 | Moore | |

(Continued)

FOREIGN PATENT DOCUMENTS

EP  0687987 A1  12/1995
JP  04015828 A  1/1992

(Continued)

OTHER PUBLICATIONS

Daniel T. Heinze et al., "LifeCode: A Deployed Application for Automated Medical Coding," AI Magazine, vol. 22, Number (2001).

(Continued)

*Primary Examiner* — Anh Tai Tran
(74) *Attorney, Agent, or Firm* — Robert Plotkin, P.C.

(57) ABSTRACT

A computer-based system includes a computer-processable definition of a region in a data set. The system identifies a region of the data set based on the definition of the region. The system provides output to a user representing a question and the identified region of the data set. The system may also automatically generate an answer to the question based on the question and the data set, and provide output to the user representing the answer. The system may generate the answer based on a subset of the data set, and provide output to the user representing the subset of the data set. The user may provide feedback on the first answer to the system, which the system may use to improve subsequent answers to the same and other questions, and to disable the system's automatic question-answering function in response to disagreement between the user and the system.

84 Claims, 4 Drawing Sheets

(56) References Cited

U.S. PATENT DOCUMENTS

| | | |
|---|---|---|
| 7,716,040 B2 | 5/2010 | Koll |
| 2002/0016529 A1* | 2/2002 | Iliff .............................. 600/300 |
| 2002/0049628 A1 | 4/2002 | West |
| 2003/0069877 A1 | 4/2003 | Grefenstette et al. |
| 2003/0105638 A1* | 6/2003 | Taira .............................. 704/275 |
| 2004/0128163 A1 | 7/2004 | Goodman |
| 2004/0172297 A1 | 9/2004 | Rao et al. |
| 2004/0176979 A1 | 9/2004 | Gottlieb et al. |
| 2004/0243545 A1 | 12/2004 | Boone |
| 2005/0102146 A1 | 5/2005 | Lucas |
| 2005/0137910 A1* | 6/2005 | Rao et al. .......................... 705/3 |
| 2005/0158767 A1 | 7/2005 | Haskell |
| 2005/0240439 A1 | 10/2005 | Covit et al. |
| 2005/0251422 A1 | 11/2005 | Wolfman et al. |
| 2006/0020493 A1 | 1/2006 | Cousineau |
| 2006/0074719 A1* | 4/2006 | Horner .............................. 705/3 |
| 2006/0122865 A1 | 6/2006 | Preiss |
| 2007/0050187 A1 | 3/2007 | Cox |
| 2007/0088564 A1 | 4/2007 | March, Jr. et al. |
| 2007/0106751 A1 | 5/2007 | Moore |
| 2007/0118410 A1 | 5/2007 | Nadai |
| 2007/0143141 A1 | 6/2007 | Villasenor |
| 2007/0198907 A1 | 8/2007 | Degala |
| 2008/0005064 A1 | 1/2008 | Sarukkai |
| 2008/0077451 A1 | 3/2008 | Anthony |
| 2008/0134038 A1 | 6/2008 | Oh |
| 2009/0055168 A1 | 2/2009 | Wu |
| 2009/0287678 A1 | 11/2009 | Brown |
| 2010/0036680 A1 | 2/2010 | Familant |
| 2010/0138241 A1 | 6/2010 | Ruark |
| 2010/0217624 A1 | 8/2010 | Kay |
| 2012/0041950 A1 | 2/2012 | Koll |
| 2012/0166220 A1 | 6/2012 | Baldwin |
| 2012/0323598 A1 | 12/2012 | Koll |

FOREIGN PATENT DOCUMENTS

| | | |
|---|---|---|
| JP | 2002207823 A | 7/2002 |
| JP | 2004157815 A | 6/2004 |
| JP | 2005025418 A | 1/2005 |
| JP | 2006072436 A | 3/2006 |
| JP | 2008250378 A | 10/2008 |
| JP | 2011118538 A | 6/2011 |
| WO | 2011100474 A2 | 8/2011 |
| WO | 2011100474 A3 | 1/2012 |

OTHER PUBLICATIONS

International Search Report received for International Patent Application No. PCT/US2011/024405, mailed on Nov. 28, 2011, 3 pages.

International Search Report and Written Opinion received for International Patent Application No. PCT/US2011/052983, mailed on Apr. 25, 2012, 8 pages.

Sase Tsutomu, "Donyukoka wo Saidaigen ni Hakki RAC Shisutemu Kochikukannzen Manyuaru," DB Magazine, Shoeisha K. K. 2005, Aug. 1, vol. 15, No. 4, pp. 93 to 105.

Suzuki Yu, et. al "Kojin Tekiou in yoru Einichihonyaku de no Yakugokoho no Junitsuke", The Association for Natural Language Processing, 12th Annual Congress, The Association for Natural Language Processing, 2006, Mar., 13, pp. 260 to 263.

* cited by examiner

PROVIDING COMPUTABLE GUIDANCE TO RELEVANT EVIDENCE IN QUESTION-ANSWERING SYSTEMS

CROSS-REFERENCE TO RELATED APPLICATIONS

This application claims priority from commonly-owned U.S. Provisional Patent Application Ser. No. 61/303,242, filed on Feb. 10, 2010, entitled, "Providing Computable Guidance to Relevant Evidence in Question-Answering Systems," which is hereby incorporated by reference herein.

BACKGROUND

There are a variety of situations in which a human operator has to answer a set of discrete questions given a corpus of documents containing information pertaining to the questions. One example of such a situation is that in which a human operator is tasked with associating billing codes with a hospital stay of a patient, based on a collection of all documents containing information about the patient's hospital stay. Such documents may, for example, contain information about the medical procedures that were performed on the patient during the stay and other billable activities performed by hospital staff in connection with the patient during the stay.

This set of documents may be viewed as a corpus of evidence for the billing codes that need to be generated and provided to an insurer for reimbursement. The task of the human operator, a billing coding expert in this example, is to derive a set of billing codes that are justified by the given corpus of documents, considering applicable rules and regulations. Mapping the content of the documents to a set of billing codes is a demanding cognitive task. It may involve, for example, reading reports of surgeries performed on the patient and determining not only which surgeries were performed, but also identifying the personnel who participated in such surgeries, and the type and quantity of materials used in such surgeries (e.g., the number of stents inserted into the patient's arteries), since such information may influence the billing codes that need to be generated to obtain appropriate reimbursement. Such information may not be presented within the documents in a format that matches the requirements of the billing code system. As a result, the human operator may need to carefully examine the document corpus to extract such information.

Because of such difficulties inherent in generating billing codes based on a document corpus, various computer-based support systems have been developed to guide human coders through the process of deciding which billing codes to generate based on the available evidence. Some such systems guide the human coder through a decision network, where each non-leaf node of the network consists of a question to be answered by the coder. Each answer provided by the human coder to a non-leaf node question determines the next path segment to be followed through the network, and hence the next question to be asked of the coder by the system. In response to receiving an answer from the coder to a question corresponding to a leaf node, the system returns a unique billing code corresponding to the leaf node.

Despite such guidance, it can still be difficult for the human coder to identify the information necessary to answer each question. What is needed, therefore, are improved techniques for generating answers to questions based on an available evidence corpus.

SUMMARY

A computer-based system includes a computer-processable definition of a region in a data set. The system identifies a region of the data set based on the definition of the region. The system provides output to a user representing a question and the identified region of the data set. The system may also automatically generate an answer to the question based on the question and the data set, and provide output to the user representing the answer. The system may generate the answer based on a subset of the data set, and provide output to the user representing the subset of the data set. The user may provide feedback on the first answer to the system, which the system may use to improve subsequent answers to the same and other questions, and to disable the system's automatic question-answering function in response to disagreement between the user and the system.

For example, one embodiment of the present invention is directed to a computer-implemented method for use with a system, wherein the system includes a data set and a first question instance including first text and a first region definition. The method includes: (1) identifying a first region of the data set based on the first region definition; (2) providing output to a user representing the first question instance; and (3) providing output to the user representing the first region of the data set.

Another embodiment of the present invention is directed to a computer-implemented method for use with a system, wherein the system includes a data set and a first question instance including first text and a first region definition. The method includes: (1) for each of a plurality of instances Q of the first question: (1) (a) identifying a region $R_Q$ of the data set based on the first region definition; (1) (b) receiving a computer-generated answer $C_Q$ in response to instance Q of the first question; (1) (c) providing output to a user representing instance Q of the first question; (1) (d) providing output to the user representing the region $R_Q$ of the data set; (1) (e) receiving input $H_Q$ from the user representing human-generated answer to instance Q of the first question; and (2) identifying a degree of agreement between the computer-generated answers $C_Q$ and the human-generated answers $H_Q$.

Other features and advantages of various aspects and embodiments of the present invention will become apparent from the following description and from the claims.

DETAILED DESCRIPTION

As described above, various computer-based support systems have been developed to guide human coders through the process of deciding which billing codes to generate based on the available evidence. For example, such a support system may guide the operator through a set of questions, but not attempt to answer any of the questions automatically itself. One extension of this approach is for the automated support system to automatically predict the answer to each question, given the evidence corpus, and thus reduce the cognitive load of the operator. This is an example of what is called an "automatic answering system" herein.

Such automatically-generated answers, however, may not always be accurate. As a result, it may be necessary for the human operator to review the correctness of some or all of the automatically-generated answers. Such manual review, however, can be tedious and time-consuming.

Embodiments of the present invention address a class of problems in which a human operator has to answer a set of discrete questions given a corpus of documents containing information pertaining to the questions. As described above, some computer-automated support systems may be capable of automatically generating answers to such questions. Such automatically-generated answers, however, may not always be accurate. As a result, it may be necessary for the human operator to review the correctness of some or all of the automatically-generated answers. Although such manual review can be tedious and time-consuming, manual review is particularly important in cases in which the system's automatically-generated answers are unreliable. Embodiments of the present invention may be used to improve the efficiency and accuracy of such manual review, and thereby to increase the efficiency and accuracy of the overall question-answering system.

Figure 1:
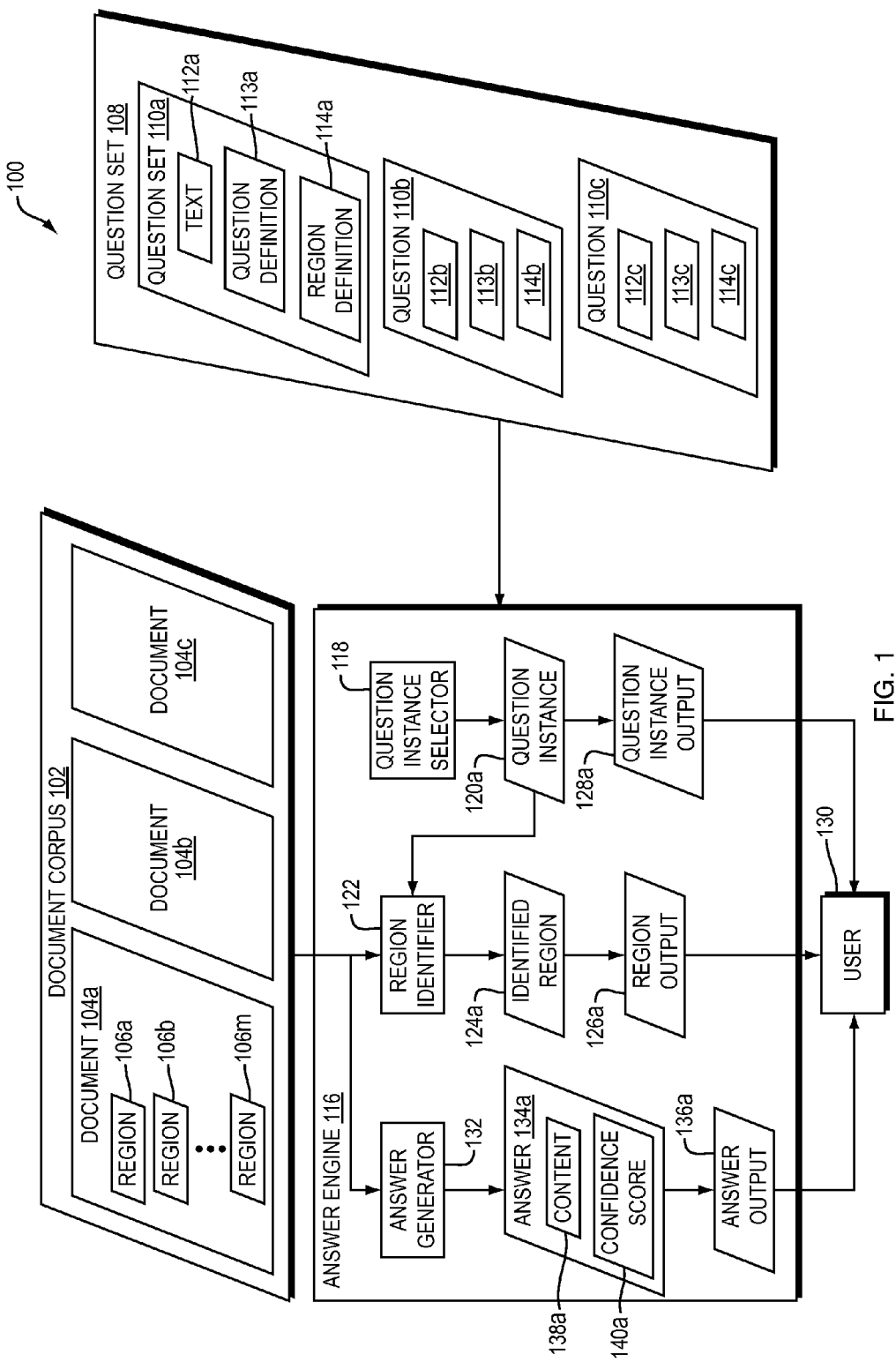
FIG. 1 is a dataflow diagram of a system for automatically identifying regions of a document corpus that are likely to contain information relevant to answering questions according to one embodiment of the present invention.
Figure 2:
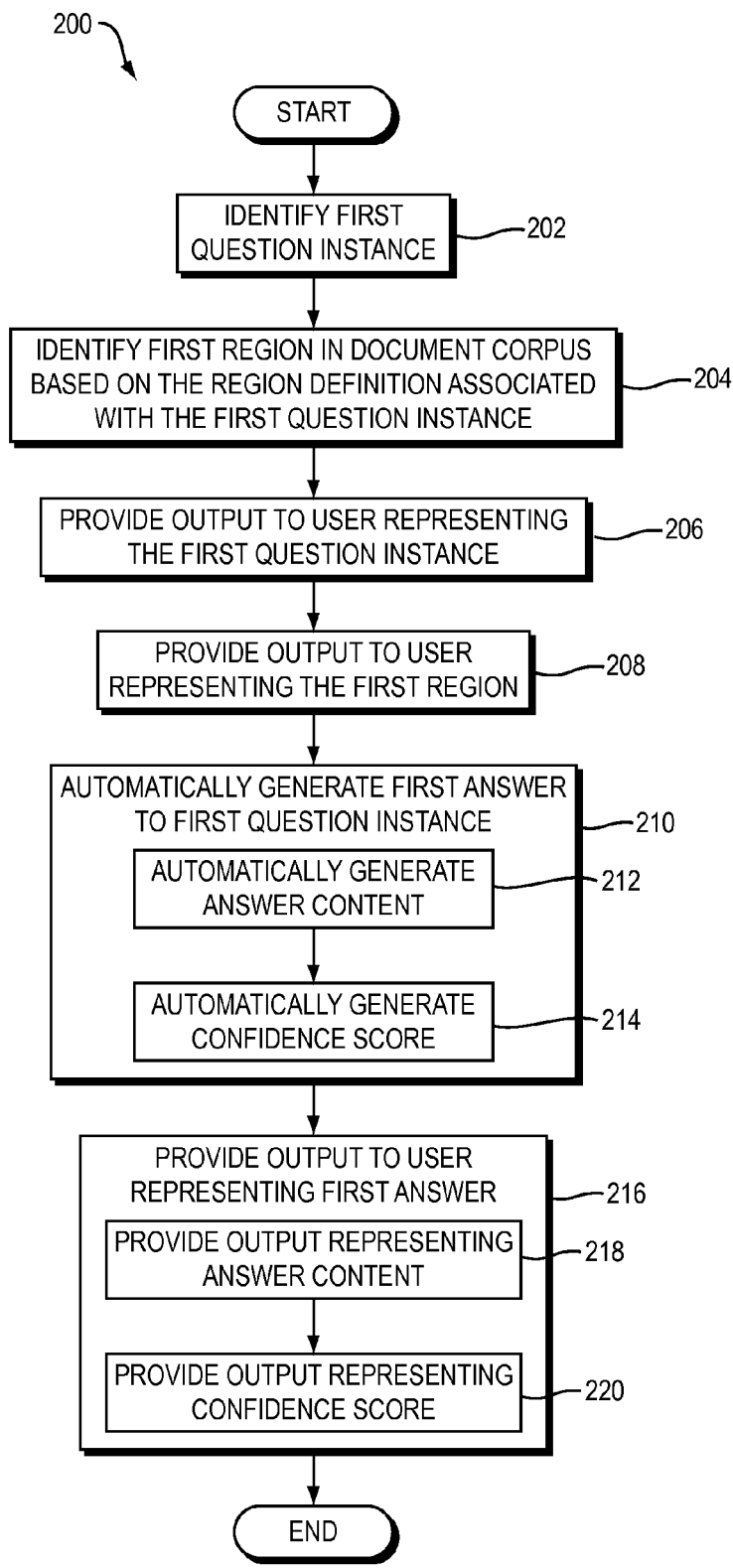
FIG. 2 is a flowchart of a method performed by the system of FIG. 1 according to one embodiment of the present invention.

Referring to FIG. 1, a dataflow diagram is shown of a question-answering system 100 according to one embodiment of the present invention. Referring to FIG. 2, a flowchart is shown of a method 200 performed by the system 100 of FIG. 1 according to one embodiment of the present invention. The system 100 includes a document corpus 102, which includes a plurality of documents 104a-n, where n may be any number. Each of the documents 104a-n may include one or more regions. For example, document 104a includes regions 106a-m, where m may be any number. Although only the regions 106a-m of document 104a are shown in FIG. 1 for ease of illustration, the remaining documents 104b-n include their own regions, which may differ in content and number from each other.

The document corpus 102 is merely one example of a "data set" as that term is used herein. More generally, such a data set may include data other than documents. However, documents are shown in FIG. 1 for ease of illustration and explanation. Furthermore, although the regions 106a-m are illustrated in FIG. 1 as predetermined disjoint subsets of the document 104a, this is merely an example and does not constitute a limitation of the present invention. Rather, as will be described below, regions within a data set may be defined and instantiated in a variety of ways.

The system 100 also includes a set 108 of questions 110a-c. Although three questions 110a-c are shown in FIG. 1, the question set 108 may include any number of questions. Furthermore, although the questions 110a-c are shown as an unstructured set in FIG. 1, the questions may be organized in any of a variety of ways. For example, the questions 108 may be organized in a hierarchy and thereby represent a decision tree. As another example, the questions 110a-c may be organized for use by a slot-filling application. Such an application requires the user to provide multiple pieces of information to fill slots, in which the pieces of information may be provided in any sequence. For example, if the questions 110a-c request information necessary to book an airplane flight (such as passenger name, origin, destination, and dates of travel), such information may be provided in any sequence to fill the necessary slots. As yet another example, the questions 110a-c may include questions which, when answered, allow one or more other questions to be answered automatically based on the answer(s) provided to previous questions.

Each of the questions 110a-c may include question text, a computable question definition, and a computable region definition. The question definition is optional. For example, as shown in FIG. 1, question 110a includes text 112a, question definition 113a, and region definition 114a; question 110b includes text 112b, question definition 113b, and region definition 114b; and question 110c includes text 112c, question definition 113c, and region definition 114c. The text associated with a particular question may include any content designed to solicit an answer to the question. Examples of such text are, "How many stents were inserted into the patient?" and "What was the age of the patient?" As these examples illustrate, the text associated with a particular question may be human-readable, but may or may not be usable by a computer to automatically generate an answer to the question.

The question definition associated with a question is a computer-processable definition of the question. In particular, and as described in more detail below, the question definition associated with a question may be processed automatically by a computer to produce an answer to the question. Such an answer may or may not be correct. Therefore, computer processing of a question definition may be viewed either as automatically answering the question or automatically attempting to answer the question. A question definition may, for example, be a query that may be applied by a search engine to the document corpus 102 to select content within the document corpus 102 (e.g., one or more of regions 106a-m), in which case the selected content represents the computer's automatically-generated answer to the question defined by the question definition.

The region definition associated with a question is a computer-processable definition of a region of the document corpus 102. As described in more detail below, the region definition associated with a question may be processed automatically by a computer to identify a region of the document corpus 102. To be most useful, the region definition associated with a particular question should be designed to identify a region of the document corpus 102 that is likely to contain information that may be used to provide an answer to the question represented by the text of the question. For example, if the text 112a of question 110a is, "How many stents were inserted into the patient?," then it would be useful for the region definition 114a of question 110a to be processable to identify a region of the document corpus 102 that is likely to contain information about the number of stents that were inserted into the patient.

The system 100 also includes an answer engine 116. In general, the answer engine 116 may automatically generate answers to one or more of the questions 110a-c in the question set 108. The answer engine 116 may use the question definitions 113a-c to generate such answers to the questions 110a-c, respectively. For example, the answer engine 116 may process question definition 113a to automatically generate an answer to question 110a, such as by performing a search of the document corpus 102 in which the question definition 113a is used as a query, thereby producing search results from within the document corpus 102 representing an answer to the question 110a.

The answer engine 116 may answer the same question multiple times, thereby producing multiple answers to the same question. The answer engine 116 may also produce answers to multiple ones of the questions 110a-c. Therefore, to avoid confusion, the description herein may state that the answer engine 116 produces answers to "instances" of the questions 110a-c. For example, the answer engine 116 may produce an answer to a first instance of question 110a, and produce an answer to a second instance of the same question 110a. As another example, the answer engine 116 may produce an answer to a first instance of question 110a, and produce an answer to a first instance of question 110b.

The answer engine 116 may include a question instance selector 118 to select (e.g., generate) an instance 120a of one of the questions 110a-c to be answered by the answer engine 116 at a particular time (FIG. 2, step 202). The question instance selector 118 may select the current question instance 120a in any of a variety of ways. For example, if the questions 110a-c in the question set 108 represent a decision tree, the question instance selector 118 may begin by generating a question instance corresponding to the question at the root of the decision tree. The question instance selector 118 may then select subsequent question instances by navigating through the decision tree based on answers provided to previous question instances. Embodiments of the present invention, however, are not limited to any particular method of selecting question instances.

The answer engine 116 also includes a region identifier 122. The region identifier 122 identifies a region 124a in the document corpus based on the region definition within (e.g., associated with) the current question instance 120a (FIG. 2, step 204). For example, if the question instance 120a is an instance of question 110a, then region identifier 122 identifies region 124a as a region of the document corpus 102 defined by the region definition 114a of question 110a.

The region definition of the current question instance 120a may define its corresponding region in a variety of ways. As a result, the region identifier 122 may identify the region 124a in a variety of ways. For example:
- a region definition may specify a document type, in which case the region identifier 122 may identify as the identified region 124a all documents in the document corpus 102 of the specified type;
- a region definition may specify a section type, in which case the region identifier 122 may identify as the identified region 124a all document sections in the document corpus 102 of the specified type;
- a region definition may specify a keyword, in which case the region identifier 122 may identify as the identified region 124a all text in the document corpus 102 which matches the specified keyword and/or which is in the vicinity of the specified keyword;
- a region definition may specify a relationship to a concept, such as "X is a Y" or "X has a Y," in which case the region identifier 122 may identify as the identified region 124a all data in the document corpus 102 having the specified relationship to other data representing the concept in the document corpus 102;

A region definition may combine multiple region specifications of the types described above in any of a variety of ways. For example, a region definition may include multiple region specifications connected by Boolean operators (e.g., AND, OR, NOT, XOR). As these examples illustrate, although the region 124a that is identified by the region identifier 122 may correspond to a single one of the predefined regions 106a-m (e.g., sections) in document 104a or one of the other documents 104b-n, this is not required. Rather, the identified region 124a may be identified dynamically by the region identifier 122, and may contain any one, two, or more contiguous and/or non-contiguous portions of data from within the document corpus 102. As this implies, the identified region 124a may, but need not, align with predefined structures within the document corpus, such as documents, sections, and tagged elements.

The answer engine 116 may provide, to a human user 130 of the system 100, output 128a representing the question instance 120a (FIG. 2, step 206) and output 126a representing the identified region 124a (FIG. 2, step 208). Such output 124a and 128a may, for example, be provided before or after the region identifier 122 has identified the region 124a. The answer engine 116 may provide the output 124a and 128a at the same or different times as each other.

The question instance output 128a may take any of a variety of forms. For example, the question instance output 128a may include the text of the question corresponding to the question instance 120a. For example, if the question instance 120a is an instance of question 110a, then the question instance output 128a may include the text 112a of question 110a.

The region output 126a may take any of a variety of forms. For example, the region output 126a may represent the entirety of the identified region 124a. For example, if the identified region 124a is a single section of the document 104a, then the region output 126a may represent the entire section of the document 104a. As another example, if the identified region 124a includes multiple (possibly non-contiguous) portions of text or other data within the document corpus 102, then the region output 126a may represent all such portions of text or other data. Such portions of text may all be within a single one of the documents 104a, or be spread among multiple ones of the documents 104a-n. For example, the identified region 124a may include a first portion of document 104a and a second portion of document 104b, in which case the region output 126a may include both such portions.

As another example, the region output 126a may represent a subset of the identified region 124a. Such a subset may, for example, be a summary of the identified region 124a, such as a portion of the identified region deemed likely to be particularly relevant to the question instance 120a.

If the identified region 124a includes multiple portions of the data set 102, such multiple portions may be output to the user 130 in a variety of ways. For example, the answer engine 116 may provide output representing all such portions to the user 130 simultaneously or substantially simultaneously with each other, such as by displaying the text of all such portions within a single window.

As another example, the answer engine 116 may initially provide output to the user 130 representing only a single one of the plurality of portions of the data set 102. The answer engine 116 may then provide output to the user 130 representing a second one of the plurality of portions of the data set 102 at a subsequent time, e.g., in response to input from the user 130. For example, the system 100 may enable the user 130 to cycle through display of the portions, such as by hitting a key or clicking a mouse button to advance from one portion to the next.

The answer engine 116 may also include an answer generator 132, which may automatically generate an answer 134a to the question instance 120a based on the question instance 120a and some or all of the document corpus 102 (FIG. 2, step 210). The answer generator 132 may also receive as input the identified region 124a and generate the answer 134a based on the question instance 120a, some or all of the document corpus, and some or all of the identified region. For example, the answer generator 132 may, in the process of generating the answer 134a, examine the identified region 124a within the document corpus 102 but not any other portion of the document corpus 102.

Note that the answer generator 132 may instead use the region definition of the question instance 120a (e.g., region definition 114a of question 110a) to select a region of the document corpus 102 to examine when generating the answer 134a. In this case, some or all of the function of the region identifier 122 is incorporated within the answer generator 132 in addition to or instead of within the region identifier 122.

The answer generator 132 may provide output 136a representing the answer 134a to the user 130 (FIG. 2, step 216). The answer output 136a may take any of a variety of forms. For example, the answer 134a may include answer content 138a (FIG. 2, step 212), and the answer output 136a may include the answer content 138a, or output derived from the answer content 138a (FIG. 2, step 218). For example, if the question instance 120a asked the question, "How many stents were inserted into the patient?," then the answer content 138a may include the text "three."

More generally, the answer content 138a may be any statement derived by the answer generator 132 from evidence, found by the answer engine 116, which provides support for the answer content 138a. The answer content 138a may, for example, positively assert or deny a Boolean question (such as "Were any stents inserted into the patient?"), a multi-choice question (such as "On what day of the Week was the surgery performed?"), a value question (such as "How many stents were inserted into the patient?"), or an open-ended question (such as "What is the chief complaint of the patient?").

The answer content 138a may also indicate that the answer generator 132 was unable to produce any answer content in response to the question instance 120a, such as in the case in which the answer generator 132 was unable to find any evidence in the document corpus 102 sufficient to justify an answer to the question instance 120a. In other words, the answer generator 132 may attempt to answer the question instance 120a, but may fail to do so. In this case, the answer content 138a may have a value, such as "N/A" or "No information," indicating that the attempt to generate an answer to the question instance 120a failed.

If the answer generator 132 generated the answer 134a based only on a particular portion (subset) of the document corpus 102 (e.g., based only on the identified region 124a or a subset of the identified region 124a), then the answer output 136a may include a representation of the particular subset of the document corpus 102 that was relied upon by the answer generator 132 to generate the answer 134a. For example, if the answer generator 132 relied upon region 106a (e.g., section, paragraph, or sentence) of document 104a, then the answer output 136a may include a representation of that region 106a (such as the full text of the region 106a). As another example, the answer output 136a may include a link or other pointer to the relied-upon portion of the document corpus 102.

Furthermore, the answer output 136a may include a representation of some or all of the identified region 124a. For example, the answer output 136a may include a representation of the entire identified region 124a even if the answer generator 132 relied upon only a subset (portion) of the identified region 124a to generator the answer 134a. It may be useful for the answer generator 132 to provide such output representing the identified region 124a to the user 130, because even portions of the region 124a not relied upon by the answer generator 132 to generate the answer 134a may contain further information related to the question instance 120a, and which the user 130 may find useful in answering the question instance 120a, in modifying the answer generator's answer 134a, or in verifying the accuracy of the answer generator's answer 134a.

Any of the particular examples of the answer output 136a described above may be combined with each other in any combination. For example, the answer output 136a may include both text representing the answer content 138a and text representing a portion of the document corpus 102 relied upon by the answer generator 132 to generate the answer 134a.

In the process of generating the answer 134a, the answer generator 132 may generate a confidence score 140a indicating a likelihood that the answer content 138a accurately answers the question instance 120a (FIG. 2, step 214). The answer output 136a may include a representation of the confidence score 138a (FIG. 2, step 220), such as in the form of a number (e.g., a decimal number ranging from 0-1 or an integer ranging from 0-100, corresponding to increasingly high confidence) or graphical display (e.g., green for high confidence, yellow for moderate confidence, and red for low confidence). Alternatively, for example, the answer generator 132 may suppress the answer output 136a in response to determining that the corresponding confidence score 138a is insufficiently high (e.g., if the confidence score 138a falls below a predetermined minimum threshold).

More generally, the answer generator 132 need not provide any output to the user 130 representing the answer 134a. Rather, the answer generator 132 may automatically generate the answer 134a but not provide any output to the user 130 representing the answer 134a. As described in more detail below, such silent automatic answer generation may be useful, for example, to track the degree of agreement between automatically-generated answers and manually-generated answers even when the user 130 is not informed of the automatically-generated answers.

As the use of the confidence score 140a illustrates, the design of the system 100 may reflect a recognition that the answer 134a may not correctly answer the question instance 120a. Certain embodiments of the present invention address this problem by automatically adjusting the operation of the question-answering system 100 based on feedback received from the user 130 (and other users) on the quality of the answer 134a and other answers generated by the answer engine 116.

Figure 3:
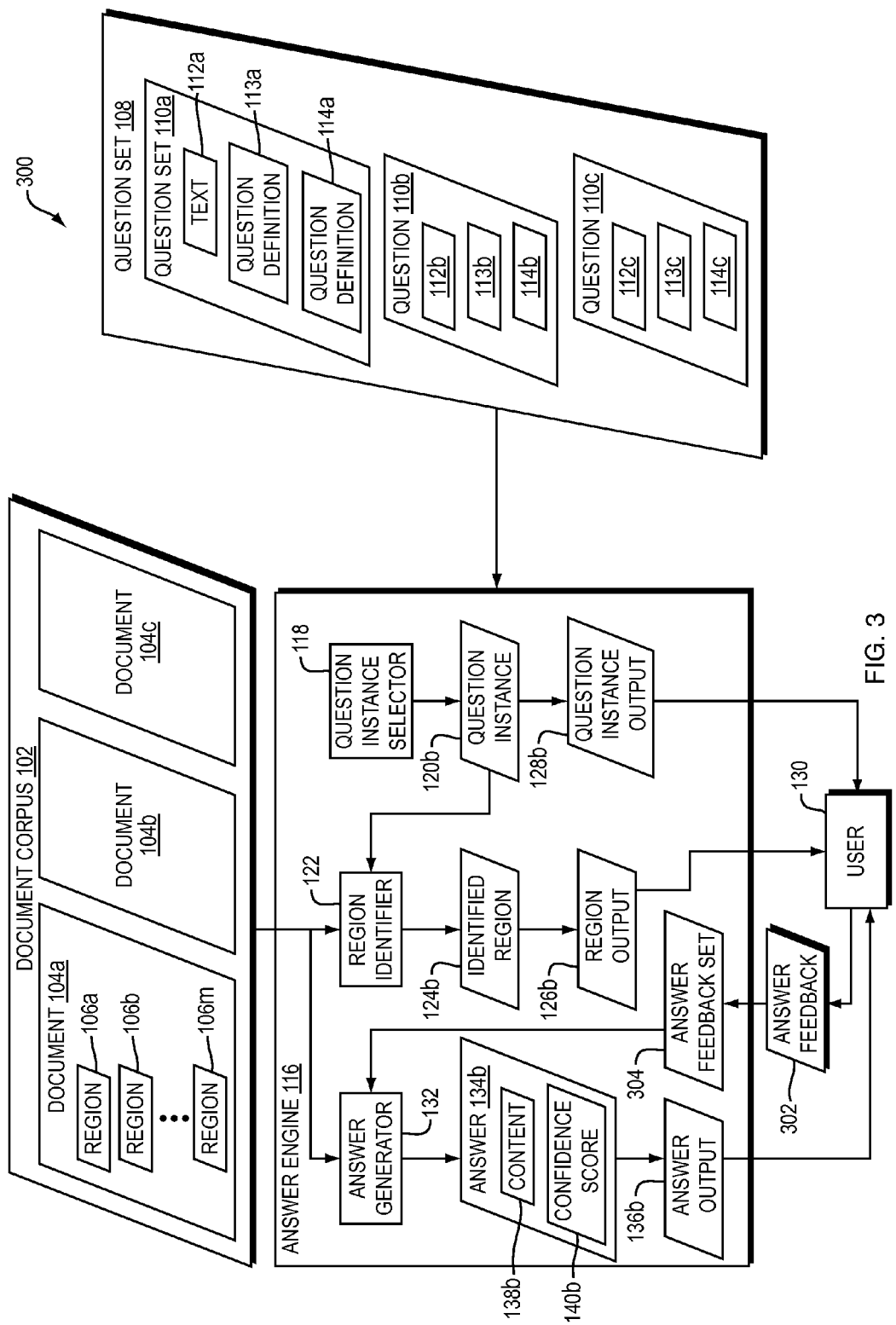
FIG. 3 is a dataflow diagram of a system for improving the automatic question-answering function of the system of FIG. 1 according to one embodiment of the present invention.
Figure 4:
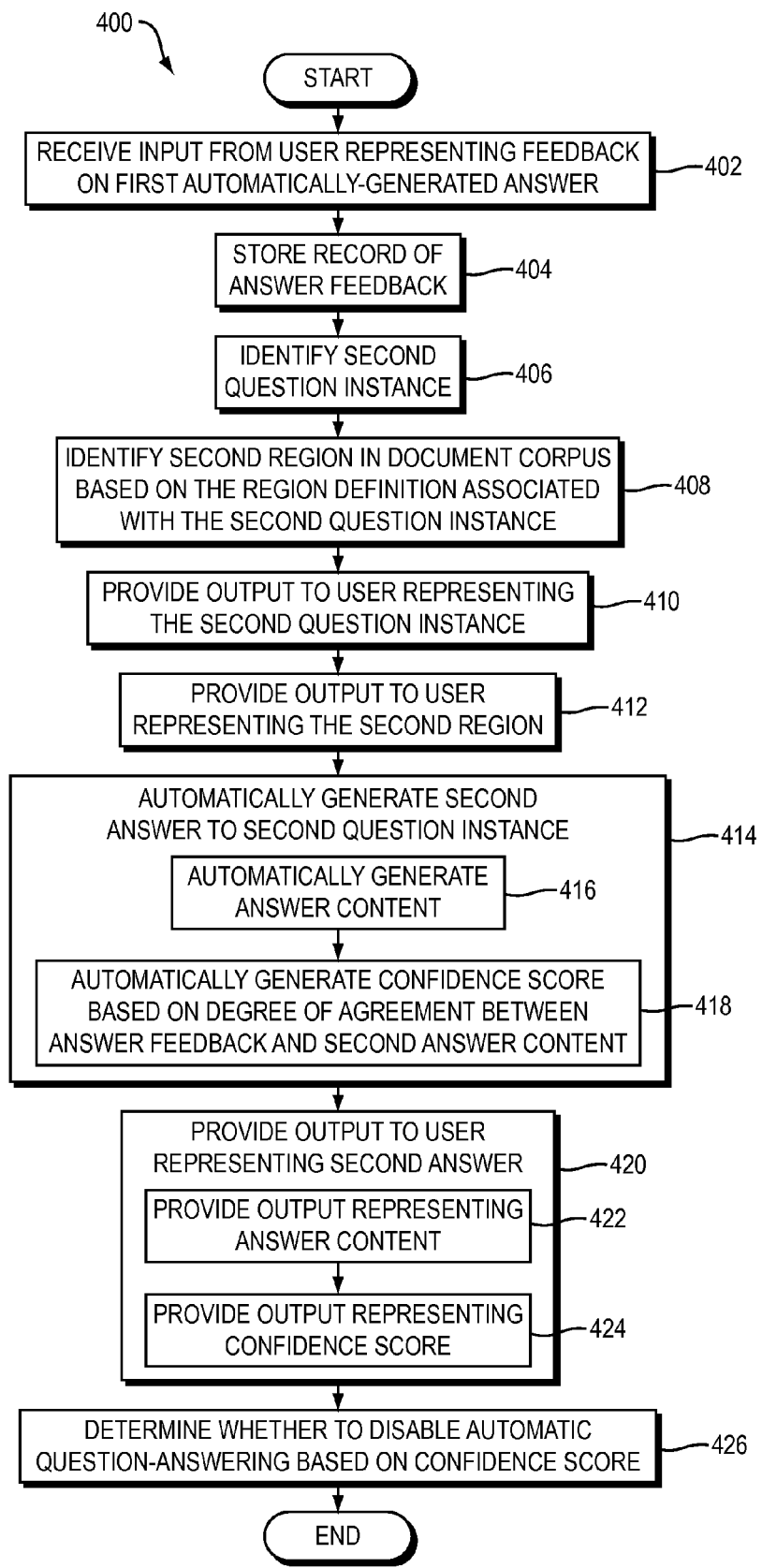
FIG. 4 is a flowchart of a method performed by the system of FIG. 3 according to one embodiment of the present invention.

For example, referring to FIG. 3, a system 300 is shown for improving the quality of answers produced by the answer engine 116. Referring to FIG. 4, a flowchart is shown of a method 400 performed by the system 300 of FIG. 3 according to one embodiment of the present invention. The method 400 of FIG. 4 may begin, for example, after the method 300 of FIG. 3 ends, e.g., after the system 100 of FIG. 1 has provided the user 130 with the region output 126a, the question instance output 120a, and possibly the answer output 136a.

The user 130 may provide feedback on the answer 314 in the form of answer feedback 302 (FIG. 4, step 402). For example, the user 130 may provide such feedback 302 to the system 300 after, and in response to, receiving the answer output 136a from the system 300. The user 130 may, however, provide the answer feedback 302 even if the system 300 did not provide the answer output 136a to the user 130.

In response to receiving the answer feedback 302, the answer engine 116 may store a record of the feedback 302, such as by storing the feedback 302 within a set 304 of feedback received from the user 130 and possibly from other users of the system 300 (FIG. 4, step 404). The answer feedback set 304 may, in other words contain feedback to multiple instances of the same question and/or feedback to instances of multiple questions. The record of the answer feedback 302 within the answer feedback set 304 may include information such as an indication of the automatically-generated answer to which the feedback 302 corresponds, and information identifying the user 130 who provided the feedback 302.

The answer feedback 302 may take any of a variety of forms. For example, the answer feedback 302 may indicate a verification status of the answer 134a, such as a binary indication of whether the answer 134a is correct or incorrect, or an indication of a degree of the user's agreement with the answer 134a (e.g., on a scale from 0-1 or from 1-100). As another example, the answer feedback 302 may represent an answer generated by the user 130 to the question instance 120a. For example, if the answer engine 116 automatically generates answer 134a but does not provide answer output 136a to the user 130, and the user 130 provides a manually-generated answer to the same question instance 120a, then the answer engine 116 may treat such a manually-generated answer as the answer feedback 302, even though such feedback 302 was not provided in response to any output to the user 130 representing the answer generated automatically by the answer engine 116.

The system 300 may use the feedback 302 to improve the performance of the system 300, such as by improving the quality of subsequent answers generated by the system 300. For example, consider the case in which the answer engine 116 attempts to answer a second question instance 120a (FIG. 4, step 406). Assume for this example that the second question instance 120b is an instance of the same question as the first question instance 120a.

The answer engine 116 may use the techniques described above with respect to FIG. 1 to identify a second region 124b in the document corpus 102 based on the region definition of the second question instance 120b (FIG. 4, step 408), to produce and provide the user 130 with second question instance output 128b representing the second question instance 120a (FIG. 4, step 410), and to produce and provide to the user 130 second region output 126b representing the second region 124b (FIG. 4, step 412). Note that the first and second question instance output 120a-b may be the same as or different from each other, the first and second identified regions 124a-b may be the same as or different from each other, and the first and second region outputs 126a-b may be the same as or different from each other.

The answer engine 116 may use the techniques described above with respect to FIG. 1 to automatically generate a second answer 134b to the second question instance 120b (FIG. 4, step 414). The second answer 134b may include second answer content 138b (FIG. 4, step 416) and a second answer confidence score 140b (FIG. 4, step 418). The second answer confidence score 140b may reflect, in whole or in part, a degree of agreement between the second answer content 138b and the feedback 302 previously provided by the user 130. For example, if the feedback 302 disconfirms the first answer content 138a, then the confidence score 140 may be lower than it would be if the feedback 302 were to confirm the first answer content 138a. More generally, if the user 130 has provided feedback to multiple instances of the question corresponding to question instances 120a and 120b, then the confidence score 140b of answer 134b may be a function, in whole or in part, of a degree of agreement between the second answer content 138 and some or all of such previous feedback.

The answer generator 132 may identify the degree of agreement between the second answer 134b and the user feedback 302 in any of a variety of ways. For example, if the user feedback 302 is in the form of an answer to the first question instance 120a, then the answer generator 132 may compare the user's answer to the second answer content 138b to identify the degree of agreement between them. As another example, if the user feedback 302 is in the form of a degree of agreement with the first answer 134a (e.g., "Correct" or "Incorrect"), then the answer generator 132 may identify the degree of agreement between the answer feedback 302 and the second answer content 138b based on the first answer content 138a, the user feedback 302, and the second answer content. For example, if the first answer content 138a is the same as the second answer content 138b and the user feedback 302 indicates disagreement with the first answer content 138a, then the answer generator 132 may conclude that the answer feedback 302 also indicates disagreement with the second answer content 138b. Conversely, if the first answer content 138a is the same as the second answer content 138b and the user feedback 302 indicates agreement with the first answer content 138a, then the answer generator 132 may conclude that the answer feedback 302 also indicates agreement with the second answer content 138b.

The answer generator 134 may produce answer output 136b, representing the answer 134b, and provide such output 136b to the user 130 (FIG. 4, step 420). The output 136b may include representations of the answer content 138b (FIG. 4, step 422) and/or the confidence score 140b (FIG. 4, step 424). Providing a representation of the confidence score 140b to the user 130, where the confidence score 140b reflects the user's previous feedback to the system 300, enables the user 130 to make an informed judgment about the degree to which the user 130 should rely upon the accuracy of the answer content 138b, and thereby enables the user 130 to make an informed judgment about whether and how thoroughly to review the identified region 124b for additional evidence relevant to the question instance 120b.

Although not shown in FIG. 3, the user 130 may provide feedback (similar to the feedback 302) on the second answer 134b and on additional answers to additional instances of the same question. All such feedback may be stored or otherwise reflected in the answer feedback set 304. Therefore any references below to use of the answer feedback 302 should also be understood to refer more generally to use of some or all of the answer feedback set 304. More generally, any of the steps described herein, such as automatically generating answers, receiving feedback on such answers, and identifying a degree of agreement between automatically-generated answers and corresponding human feedback, may be repeated for a plurality of question instances.

The system 300 may use the answer feedback 302, or some or all of the answer feedback set 304, to determine whether to enable or disable automatic answering of the question corresponding to the question instances 120a-b (FIG. 4, step 426). For example, if the answer engine 116 determines, based on the answer feedback 302, that the second answer 134b is incorrect or that the confidence score 140b of the second answer 134b is insufficiently high, then the answer engine 116 may perform one or more of the following:

prevent the answer generator 132 from generating answers to subsequent instances of the same question, or force the answer generator 132 to produce a "no answer" answer to such question instances;
  prevent the answer generator 132 from providing output 136b representing the second answer 134b to the user 130; or
  modify the second answer 134b so that the second answer content 138b represents a "no answer" answer.

In some of the examples described above, the user 130 provides the answer feedback 302 in response to the first answer 134*a*. The user 130, however, may not be required to provide such feedback in response to all answers generated automatically by the answer engine 116. For example, the answer engine 116 may determine, based on the confidence score 140*a*, whether to prompt the user 130 for feedback on the first answer 134. In particular, the answer engine 116 may prompt the user 130 for such feedback only if the confidence score 140*a* is insufficiently high, e.g., if the confidence score 140*a* does not exceed a predetermined threshold. In this way, the system 300 may make efficient use of the user's time by only asking for feedback on answers that are most likely to benefit from human review.

The answer engine 116 may identify a degree of agreement between the user feedback 302 and the corresponding automatically-generated answer 134*a* whether or not the answer engine 116 provides the user 130 with output 136 representing the automatically-generated answer 134*a*. For example, the answer engine 116 may automatically generate answer 134*a* to question instance 120*a* but not provide answer output 136*a* to the user 130. In this "silent" automatic answering mode, the answer engine 116 may receive the answer feedback 302 from the user 130 on the automatically-generated answer 134*a*, and use the feedback 302 to identify a degree of agreement between the feedback 302 and the answer 134*a*. This may be useful to perform, for example, while the automatic answering function of the answer engine 116 is disabled, to enable the answer engine 116 to continue to track and update the degree of agreement between the system 100 and the user 130. The answer engine 116 may then enable automatic answering (and automatic provision of the answer output 136*a* to the user 130) if and when the degree of agreement between the user 130 and the answer engine 116 reaches an acceptably high level (e.g., exceeds a predetermined threshold). The answer engine 116 may thereby either enable automatic provision of answer output 136*a* to the user 130 for the first time, or re-enable such output at some time after it was previously disabled.

The answer engine 116 may make any of the decisions, and take any of the actions, described above in connection with disablement and enablement of automatic question-answering, based not only in response to the degree of agreement between the answer feedback 302 and the second answer 134, but alternatively based on the degree of agreement between some or all of the answer feedback set 304 and the second answer 134. In other words, the answer engine 116 may decide whether to disable or enable automatic question answering based on multiple feedback inputs provided by the user 130 to the answer engine 116.

Any function of the answer feedback set 304, such as its mean, median, mode, minimum, or maximum value may be used to determine whether to enable or disable the answer engine's automatic answering function. As another example, any function of the degree of agreement between each unit of feedback in the feedback set 304 and the corresponding automatically-generated answer may be used to determine whether to enable or disable the answer engine's automatic answering function. For example, the answer engine 116 may disable automatic answering if the percentage of cases in which user feedback (as represented in the feedback set 304) agrees with the automatically-generated answers falls below a predetermined threshold, and enable automatic answering if the percentage of cases in which user feedback (as represented in the feedback set 304) agrees with the automatically-generated answers rises above (the same or different) predetermined threshold.

Similarly, the system 300 may include answer feedback sets in addition to the answer feedback set 304, corresponding to user 130, shown in FIG. 3. For example, the system 300 may include answer feedback sets containing feedback from a plurality of users, each of whom may provide such feedback in any of the ways disclosed herein. Such feedback sets may be combined together in any way, and then used by the system 300 to determine whether to enable or disable the answer engine's automatic answering function at any time.

In the examples described above, insufficient agreement between the user 130 and the answer engine 116 about a particular question instance may cause the answer engine 116 to disable automatic answering of other instances of the same question. As another example, insufficient agreement between the user 130 and the answer engine 116 about multiple instances of the same question may cause the answer engine 116 to disable automatic answering of other instances of the same question.

As yet another example, insufficient agreement between the user 130 and the answer engine 116 about one or more instance of the same question may cause the answer engine 116 to disable automatic answering of some or all questions 110*a-c* in the question set 108, including questions other than the one on which the user 130 and the answer engine 116 disagree. As yet another example, insufficient agreement between the user 130 and the answer engine 116 about instances of multiple questions in the answer set 108 may cause the answer engine 116 to disable automatic answering of some or all questions 110*a-c* in the question set 108, including questions other than the ones on which the user 130 and the answer engine 116 disagree.

Conversely, sufficient agreement between the user 130 and the answer engine 116 in any of the situations described above may cause the answer engine 116 to enable automatic answering of question instances and/or questions in any of the ways described above with respect to disablement of automatic answering.

The system 300 may also identify a reliability score based on the degree of agreement between the user 130 and the answer engine 116 on a particular question instance. The reliability score for that question instance represents a degree of reliability of the system's automatically-generated answer to that question instance. The system 300 may combine the reliability scores of the multiple question instances that led to an overall conclusion, to provide an overall reliability score for the conclusion. For example, if three question instances (corresponding to three questions) are answered in a sequence (by the answer engine 116 and/or the user 130) to reach the conclusion that three stents were inserted into the patient, then the system 300 may generate reliability scores for each of the three question instances, and apply a function to these three reliability scores to produce an aggregate reliability score for the overall conclusion that three stents were inserted. For example, the reliability of the billing code associated with billing for three stents could be derived from the reliability scores of the answers that were used to generate the billing code. The system 300 could then guide the operator towards answers that could (a) change the overall outcome (e.g., the billing code) if answered in a different way; and (b) would most improve the reliability of the outcome if verified by the coder.

As mentioned above, the system 300 may obtain and store records of feedback from multiple users. The feedback from each such user may include the user's own manually-generated answer to each question instance answered by the user. As a result, the system 300 may track the degree of agreement between each user's manually-generated answers to question instances and the system's automatically-generated answers to the same question instances. The system 300 may, therefore, identify individual users who have an overall high degree of agreement or disagreement with the system's automatically-generated answers. As another example, the system 300 may use the record of manually-generated answers from the community of users to develop a reference profile of answers. The system 300 may then use the reference profile to identify, for example, individual human operators who agree with the system's automatically-generated answers significantly more or less frequently than the norm indicated by the reference profile. Such identification may be performed on a per-question basis or across multiple (e.g., all) questions.

Identification of such an outlying user may cause the system 300 to generate a message representing an alert, because such disagreement between the outlying user and his peers could indicate a systematic disagreement on the underlying rules (e.g., the outlying user may misinterpret the question asked, or may lack knowledge of a rule). As another example, if one group of operators (e.g., all of the coders at a particular medical facility) strongly deviates from an average profile of similar other sites, this could prompt further investigations into the underlying reasons for such deviation.

As yet another example, the system 300 may track which regions of the document corpus 102 are actually relied upon by the user 130 and/or other users to generate their answers to the questions 110a-c. Such tracking may be performed, for example, by monitoring user actions (such as viewing of particular regions and/or cutting and pasting text from particular regions) and/or by tracking the regions cited by the users in their answers (e.g., the answer feedback 302 in FIG. 3). The system 300 may analyze such regions actually relied upon by the users to determine whether the regions of interest identified by the system 300 as potentially helpful (e.g., the identified region 124) are in fact helpful to the users.

If the system determines that a particular region identified by the region definition of one of the questions in the question set 108 is not actually relied upon by users of the system 300 with sufficient frequency (e.g., if the frequency of actual reliance of such a region falls below a predetermined threshold), then the system 300 may cease identifying such a region as potentially relevant to that question. The system 300 may, for example, modify the region definition which identified the non-relied upon region so as to exclude the non-relied upon region from the region definition.

Conversely, if the system determines that users of the system actually rely upon a particular region in the document corpus 102 with a sufficiently high frequency (e.g., if the frequency of actual reliance of such a region exceeds a predetermined threshold) when answering a particular question in the question set 108, then the system may subsequently identify that region to users when presenting the same question to the users. The system 300 may, for example, modify the region definition of that question to include the region actually relied upon by the users.

Embodiments of the present invention have a variety of advantages. For example, embodiments of the present invention automate the process of identifying regions in a document corpus that are likely to contain information relevant to answer a question. This reduces the burden on the human operator to find such regions. Instead, the system may automatically display such potentially-relevant regions to the user, thereby simplifying the user's task of answering the question. This may represent a significant time savings if the regions in question are contained within a large document corpus and are therefore difficult to find. This is true even in cases in which the system itself is not capable of generating an answer automatically.

The system may also use such automatically-identified regions to generate answers automatically. The ability to home in on potentially relevant regions may increase the accuracy of the system's automatic question answering component. Even if human review of such automatically-generated answers is required, the ability to automatically generate answers that are more likely to be correct may reduce the amount of time required for such human verification.

Enabling human-computer agreement to be tracked automatically for individual component questions can allow support functionality to be automatically enabled or disabled, whether for individual component questions or for the system as a whole. This ability can reduce the likelihood that automatically-generated guidance will mislead the human reviewer in those situations in which such guidance has been demonstrated to be unreliable, while allowing such guidance to continue to be given when it is reliable. Similarly, tracking the performance of individual human reviewers against a reference set of similar human reviewers can enable reviewers with particularly low or particularly high reliability to be identified, thereby enabling the system to be improved.

Another benefit of various embodiments of the present invention is that they break down the billing coding problem into small, individually-solvable steps. The questions posed in these individual steps may be more understandable to human users (e.g., coders and physicians). As a result, the human users are more likely to provide accurate answers, and to do so more quickly and easily than if they are faced with the entirety of the complex billing coding problem as a whole.

Another benefit of embodiments of the present invention is that they can be gradually merged, or "grown-into," existing systems without requiring that such existing systems be eliminated or replaced entirely in a single step. For example, existing systems in which codes are input entirely manually by a human reviewer may be supplemented by embodiments of the present invention, which may make suggestions to such human reviewers to enable them to work more efficiently. As another example, existing systems in which codes are generated automatically or semi-automatically may be supplemented by embodiments of the present invention, which may provide guidance to human reviewers to double-check and fix the automatically-generated answers. Over time, embodiments of the present invention may be used to take on additional functions without requiring that all such functions be adopted at once.

Yet another advantage of embodiments of the present invention is that they provide the best of both human-generated and computer-generated answers. Even if, in theory, a fully computerized system could use natural language processing to automatically generate answers to all questions, it would be prohibitively expensive to formally define computer-executable rules for all questions. Embodiments of the present invention enable the benefits of computer automation to be obtain by combining such automation with human skill, thereby obtaining the advantages of both computer automation and human judgment, but with higher accuracy and lower cost than could be obtained by a system which used only computers or only humans.

As yet another example, embodiments of the present invention may assist a user in answering a question by providing the user not only with the question itself, but also with information about regions of a document corpus that may be helpful to examine to answer the question. Such potentially-relevant regions may be identified automatically by the system in any of a variety of ways. In particular, it should be noted that the system may identify a region that potentially contains information relevant to answering a question using a region definition that is independent of the content of the question itself. For example, if the question is, "Does the patient have congestive heart failure?," the region definition for that question may point to the "Conditions" section of the patient's electronic medical record. In other words, the system need not use any of the text of the question to identify regions that are potentially relevant to answering the question. In fact, the question's text and the question's region definition may have no terms in common. Similarly, the question definition and region definition within a particular question need not share any text or other content in common. This reflects the fact that the question (text and/or definition) and the corresponding region definition serve different purposes. The purpose of the question is to specify which information is being sought (i.e., the "what"), while the purpose of the corresponding region definition is to specify where to look for that information (i.e., the "where").

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

The techniques described above may be implemented, for example, in hardware, software tangibly embodied in a computer-readable medium, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a non-transitory computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A method performed by at least one computer processor, the method comprising:
    (a) selecting, by the at least one computer processor, a first question instance including first text and a first region definition designed to identify a region of a data set likely to contain information that may be used to provide an answer to the question represented by the first text, the region definition identifying a region aligned with a tagged element in the data set;
    (b) automatically identifying, by the at least one computer processor, before (c) and (d), the first region of the data set, based on the first region definition;
    (c) providing output, by the at least one computer processor, to a user representing the first question instance; and
    (d) providing output, by the at least one computer processor, to the user, the output representing the first region of the data set before receiving an answer to the first question instance.

2. The method of claim 1, wherein (b) further comprises:
    automatically identifying, by the at least one computer processor, a first document type specified by the first region definition; and
    automatically identifying, by the at least one computer processor, a document of the first document type in the data set.

3. The method of claim 1, wherein (b) further comprises:
    identifying a section type specified by the first region definition; and
    identifying a section of the section type in the data set.

4. The method of claim 1, wherein (b) further comprises:
    identifying a keyword specified by the first region definition; and
    identifying text in the data set matching the keyword.

5. The method of claim 1, wherein (b) further comprises:
    identifying a keyword specified by the first region definition; and
    identifying text near the keyword in the data set.

6. The method of claim 1, wherein (b) further comprises:
    identifying a relationship to a concept, the relationship specified by the first region definition; and
    identifying first coded data in the data set having the specified relationship to second coded data representing the concept in the data set.

7. The method of claim 6, wherein the relationship comprises an "is a" relationship.

8. The method of claim 6, wherein the relationship comprises a "has a" relationship.

9. The method of claim 1, wherein (b) comprises identifying a plurality of portions of the data set based on the first region definition, wherein the first region includes the plurality of portions.

10. The method of claim 9, wherein (d) comprises providing output to the user representing the plurality of portions of the data set.

11. The method of claim 10, wherein (d) comprises providing output to the user simultaneously representing the plurality of portions of the data set.

12. The method of claim 10, wherein (d) comprises:
(d)(1) providing output to the user representing a first one of the plurality of portions of the data set;
(d)(2) receiving input from the user; and
(d)(3) in response to the input from the user, providing output to the user representing a second one of the plurality of portions of the data set.

13. The method of claim 9:
wherein the data set includes a plurality of documents;
wherein the plurality of portions includes a first portion of a first one of the plurality of documents; and
wherein the plurality of portions includes a second portion of a second one of the plurality of documents.

14. The method of claim 1, wherein (d) comprises providing output to the user representing the entirety of the first region of the data set.

15. The method of claim 1, wherein (d) comprises providing output to the user representing a subset of the first region of the data set.

16. The method of claim 1, wherein (d) comprises providing output to the user representing a summary of the first region of the data set.

17. The method of claim 1, further comprising:
(e) automatically generating a first answer to the first question instance based on the first region definition in the first question instance and the data set.

18. The method of claim 17, further comprising:
(f) providing output to the user representing the first answer.

19. The method of claim 17:
wherein (e) comprises automatically generating the first answer to the first question instance based on a particular subset of the data set; and
wherein the method further comprises:
(f) providing output to the user representing the particular subset of the data set.

20. The method of claim 17, wherein the first answer includes answer content and a confidence score indicating a likelihood that the answer content accurately answers the first question instance.

21. The method of claim 20, wherein (e) comprises automatically generating the confidence score based on a degree of agreement between the answer content and at least one previous answer to the first question instance received from a human.

22. The method of claim 17, wherein the first answer includes at least one pointer to at least one portion of the data set relied upon in (e) to generate the first answer.

23. The method of claim 17, further comprising:
(f) receiving input from the user representing feedback on the first answer; and
(g) storing, in a computer-readable medium, a record of the input.

24. The method of claim 23, wherein the input from the user indicates a verification status of the first answer.

25. The method of claim 24 further comprising:
(h) accessing a second question instance including second text and a second region definition; and
(i) determining whether to generate an answer to the second question based on the verification status of the first answer.

26. The method of claim 23, wherein the input from the user represents a second answer to the first question instance.

27. The method of claim 26 further comprising:
(h) accessing a second question instance including second text and a second region definition; and
(i) generating an answer to the second question instance only if the first answer is in agreement with the second answer.

28. The method of claim 17, further comprising:
(f) generating a confidence score indicating a likelihood that the answer content accurately answers the first question instance;
(g) determining, based on the confidence score, whether to prompt the user for input representing feedback on the first answer; and
(h) prompting the user for input representing feedback on the first answer only if it is determined that the user should be prompted for the input.

29. The method of claim 17, wherein the first question instance further comprises a first question definition, and wherein (e) comprises processing the first question definition to automatically generate the first answer.

30. The method of claim 29, wherein (e) comprises applying the first question definition as a query to the data set to select a subset of the data set as the first answer.

31. The method of claim 29, wherein the first question definition is independent of the first text.

32. The method of claim 1, further comprising:
(e) attempting to generate a first answer to the first question instance based on the first question instance and the data set;
(f) if the attempt to generate the first answer failed, then providing output to the user indicating that the attempt to generate the first answer failed.

33. The method of claim 1, wherein the first region definition is independent of the first text.

34. A non-transitory computer-readable medium comprising computer-readable instructions tangibly stored on the non-transitory computer-readable medium, wherein the instructions are executable by at least one computer processor to execute a method for use with a system, the non-transitory computer-readable medium comprising:
instructions to select, by the at least one computer processor, a first question instance including first text and a first region definition designed to identify a region of a data set likely to contain information that may be used to provide an answer to the question represented by the first text, the region definition identifying a region aligned with a tagged element in the data set;
instructions to automatically identify, by the at least one computer processor, before providing output to a user representing the first question instance and before providing output to the user representing the first region of the data set, the first region of the data set, based on the first region definition;
instructions to provide output, by the at least one computer processor, to a user representing the first question instance; and
instructions to provide output, by the at least one computer processor, to the user, the output representing the first region of the data set before receiving an answer to the first question instance.

35. The non-transitory computer-readable medium of claim 34, wherein the instructions to identify further comprise:
instructions to automatically identify, by the at least one computer processor, a first document type specified by the first region definition; and
instructions to automatically identify, by the at least one computer processor, a document of the first document type in the data set.

36. The non-transitory computer-readable medium of claim 34, wherein the instructions to identify further comprise:
   instructions to identify a section type specified by the first region definition; and
   instructions to identify a section of the section type in the data set.

37. The non-transitory computer-readable medium of claim 34, wherein the instructions to identify further comprise:
   instructions to identify a keyword specified by the first region definition; and
   instructions to identify text in the data set matching the keyword.

38. The non-transitory computer-readable medium of claim 34, wherein the instructions to identify further comprise:
   instructions to identify a keyword specified by the first region definition; and
   instructions to identify text near the keyword in the data set.

39. The non-transitory computer-readable medium of claim 34, wherein the instructions to identify further comprise:
   instructions to identify a relationship to a concept, the relationship specified by the first region definition; and
   instructions to identify first coded data in the data set having the specified relationship to second coded data representing the concept in the data set.

40. The non-transitory computer-readable medium of claim 39, wherein the relationship comprises an "is a" relationship.

41. The non-transitory computer-readable medium of claim 39, wherein the relationship comprises a "has a" relationship.

42. The non-transitory computer-readable medium of claim 34, wherein the instructions to identify) comprise instructions to identify a plurality of portions of the data set based on the first region definition, wherein the first region includes the plurality of portions.

43. The non-transitory computer-readable medium of claim 42, wherein the instructions to provide output representing the first region comprises providing output to the user representing the plurality of portions of the data set.

44. The non-transitory computer-readable medium of claim 43, wherein the instructions to provide output representing the first region comprises providing output to the user simultaneously representing the plurality of portions of the data set.

45. The non-transitory computer-readable medium of claim 43, wherein the instructions to provide output representing the first region) comprises:
   instructions to provide output to the user representing a first one of the plurality of portions of the data set;
   instructions to receive input from the user; and
   instructions to provide, in response to the input from the user, output to the user representing a second one of the plurality of portions of the data set.

46. The non-transitory computer-readable medium of claim 42:
   wherein the data set includes a plurality of documents;
   wherein the plurality of portions includes a first portion of a first one of the plurality of documents; and
   wherein the plurality of portions includes a second portion of a second one of the plurality of documents.

47. The non-transitory computer-readable medium of claim 34, wherein the instructions to provide output representing the first region comprises instructions to provide output the user representing the entirety of the first region of the data set.

48. The non-transitory computer-readable medium of claim 34, wherein the instructions to provide output representing the first region comprises instructions to provide output to the user representing a subset of the first region of the data set.

49. The non-transitory computer-readable medium of claim 34, wherein the instructions to provide output representing the first region comprises instructions to provide output to the user representing a summary of the first region of the data set.

50. The non-transitory computer-readable medium of claim 34, wherein the method further comprises:
   instructions to automatically generate a first answer to the first question instance based on the first question instance and the data set.

51. The non-transitory computer-readable medium of claim 50, wherein the method further comprises:
   instructions to provide output to the user representing the first answer.

52. The non-transitory computer-readable medium of claim 50:
   wherein the instructions to automatically generate a first answer comprise instructions to automatically generate the first answer to the first question instance based on a particular subset of the data set; and
   wherein the computer-readable medium further comprises:
   instructions to provide output to the user representing the particular subset of the data set.

53. The non-transitory computer-readable medium of claim 50, wherein the first answer includes answer content and a confidence score indicating a likelihood that the answer content accurately answers the first question instance.

54. The non-transitory computer-readable medium of claim 53, wherein the instructions to automatically generate a first answer comprises instructions to automatically generate the confidence score based on a degree of agreement between the answer content and at least one previous answer to the first question instance received from a human.

55. The non-transitory computer-readable medium of claim 50, wherein the first answer includes at least one pointer to at least one portion of the data set relied upon in the instructions to automatically generate a first answer to generate the first answer.

56. The non-transitory computer-readable medium of claim 50, further comprising:
   instructions to receive input from the user representing feedback on the first answer; and
   instructions to store, in a computer-readable medium, a record of the input.

57. The non-transitory computer-readable medium of claim 56, wherein the input from the user indicates a verification status of the first answer.

58. The non-transitory computer-readable medium of claim 57:
   wherein the system further comprises a second question instance including second text and a second region definition; and
   wherein the computer-readable medium further comprises:
   instructions to determine whether to generate an answer to the second question based on the verification status of the first answer.

59. The non-transitory computer-readable medium of claim 56, wherein the input from the user represents a second answer to the first question instance.

60. The non-transitory computer-readable medium of claim 59:
   instructions to generate an answer to a second question instance only if the first answer is in agreement with the second answer, the second question instance including second text and a second region definition.

61. The non-transitory computer-readable medium of claim 50, further comprising:
   instructions to generate a confidence score indicating a likelihood that the answer content accurately answers the first question instance;
   instructions to determine, based on the confidence score, whether to prompt the user for input representing feedback on the first answer; and
   instructions to prompt the user for input representing feedback on the first answer only if it is determined that the user should be prompted for the input.

62. The non-transitory computer-readable medium of claim 50, wherein the first question instance further comprises a first question definition, and wherein the instructions to automatically generate a first answer comprises instructions to process the first question definition to automatically generate the first answer.

63. The non-transitory computer-readable medium of claim 62, wherein the instructions to automatically generate a first answer comprises instructions to apply the first question definition as a query to the data set to select a subset of the data set as the first answer.

64. The non-transitory computer-readable medium of claim 62, wherein the first question definition is independent of the first text.

65. The non-transitory computer-readable medium of claim 34 further comprising:
   instructions to attempt to generate a first answer to the first question instance based on the first question instance and the data set;
   instructions to provide, if the attempt to generate the first answer failed, output to the user indicating that the attempt to generate the first answer failed.

66. The non-transitory computer-readable medium of claim 34, wherein the first region definition is independent of the first text.

67. A computer-implemented method for use with a system, the method comprising:
   (a) selecting a first question instance including first text and a first region definition designed to identify a region of a data set likely to contain information that may be used to provide an answer to the question represented by the first text, the region definition identifying a region aligned with a tagged element in the data set;
   (b) before (c), for each of a plurality of instances Q of the first question:
   (b-1) identifying a region $R_Q$ of the data set based on the first region definition;
   (b-2) receiving a computer-generated answer $C_Q$ in response to instance Q of the first question;
   (b-3) providing output to a user representing instance Q of the first question;
   (b-4) providing output to the user representing the region $R_Q$ of the data set, before (b-5);
   (b-5) receiving input $H_Q$ from the user representing human-generated answer to instance Q of the first question; and
   (c) identifying a degree of agreement between the computer-generated answers $C_Q$ and the human-generated answers $H_Q$.

68. The method of claim 67, further comprising:
   (d) determining, based on the degree of agreement, whether to automatically generate an answer to an additional instance of the first question; and
   (e) automatically generating an answer to the additional question only if it is determined in (d) that such an answer should be automatically generated.

69. The method of claim 67, further comprising:
   (d) receiving an additional instance of the first question;
   (e) determining whether the degree of agreement satisfies a predetermined threshold; and
   (f) if the degree of agreement does not satisfy the predetermined threshold, then providing output in response to the additional instance of the first question indicating that no automated answer to the additional instance of the first question has been generated.

70. The method of claim 67, further comprising:
   (d) automatically generating an additional answer to an additional instance of the first question; and
   (e) identifying a degree of agreement between the additional answer and the human-generated answers $H_Q$.

71. The method of claim 67, wherein the human-generated answers $H_Q$ includes a plurality of human-generated answers provided by a first set of human answerers and a plurality of human-generated answers provided by a second set of at least one human answerer, and wherein the method further comprises:
   (d) calculating a first degree of agreement between the plurality of human-generated answers provided by the first set of human answerers and the computer-generated answers $C_Q$;
   (e) calculating a second degree of agreement between the plurality of human-generated answers provided by the second set of at least one human answerer and the plurality of computer-generated answers $C_Q$; and
   (f) calculating a difference between the first degree of agreement and the second degree of agreement.

72. The method of claim 67, further comprising:
   (d) determining that the human-generated answers $H_Q$ include an indication of an additional region $R_H$ in the data set relied upon to generate at least one of the human-generated answers $H_Q$, wherein the region $R_H$ is not one of the regions $R_Q$; and
   (e) modifying the first region definition to include a definition of the additional region $R_H$.

73. The method of claim 67, wherein (b) further comprises:
   (b-6) providing output to the user representing the computer-generated answer $C_Q$.

74. A non-transitory computer-readable medium comprising computer-readable instructions tangibly stored on the non-transitory computer-readable medium, wherein the instructions are executable by at least one computer processor to execute a method for use with a system, the non-transitory computer-readable medium comprising:
   (a) instructions to select a first question instance including first text and a first region definition designed to identify a region of a data set likely to contain information that may be used to provide an answer to the question represented by the first text, the region definition identifying a region aligned with a tagged element in the data set;
   (b) before (c), for each of a plurality of instances Q of the first question:
   (b-1) instructions to identify a region $R_Q$ of the data set based on the first region definition;
   (b-2) instructions to receive a computer-generated answer $C_Q$ in response to instance Q of the first question;

(b-3) instructions to provide output to a user representing instance Q of the first question;

(b-4) instructions to provide output to the user representing the region $R_Q$ of the data set;

(b-5) instructions to receive input $H_Q$ from the user representing human-generated answer to instance Q of the first question; and (c) instructions to identify a degree of agreement between the computer-generated answers $C_Q$ and the human-generated answers $H_Q$.

75. The non-transitory computer-readable medium of claim 74, wherein the non-transitory computer-readable medium further comprises:

(d) instructions to determine, based on the degree of agreement, whether to automatically generate an answer to an additional instance of the first question; and (e) instructions to automatically generate an answer to the additional question only if it is determined in (d) that such an answer should be automatically generated.

76. The non-transitory computer-readable medium of claim 74, wherein the non-transitory computer-readable medium further comprises:

(d) instructions to receive an additional instance of the first question;

(e) instructions to determine whether the degree of agreement satisfies a predetermined threshold; and (f) instructions to provide, if the degree of agreement does not satisfy the predetermined threshold, output in response to the additional instance of the first question indicating that no automated answer to the additional instance of the first question has been generated.

77. The non-transitory computer-readable medium of claim 74, wherein the non-transitory computer-readable medium further comprises:

(d) instructions to automatically generate an additional answer to an additional instance of the first question; and (e) instructions to identify a degree of agreement between the additional answer and the human-generated answers $H_Q$.

78. The non-transitory computer-readable medium of claim 74, wherein the human-generated answers $H_Q$ includes a plurality of human-generated answers provided by a first set of human answerers and a plurality of human-generated answers provided by a second set of at least one human answerer, and wherein the non-transitory computer-readable medium further comprises:

(d) instructions to calculate a first degree of agreement between the plurality of human-generated answers provided by the first set of human answerers and the computer-generated answers $C_Q$;

(e) instructions to calculate a second degree of agreement between the plurality of human-generated answers provided by the second set of at least one human answerer and the plurality of computer-generated answers $C_Q$; and (f) instructions to calculate a difference between the first degree of agreement and the second degree of agreement.

79. The non-transitory computer-readable medium of claim 74, wherein the non-transitory computer-readable medium further comprises:

(d) instructions to determine that the human-generated answers $H_Q$ include an indication of an additional region $R_H$ in the data set relied upon to generate at least one of the human-generated answers $H_Q$, wherein the region $R_H$ is not one of the regions $R_Q$; and (e) instructions to modify the first region definition to include a definition of the additional region $R_H$.

80. The non-transitory computer-readable medium of claim 74, wherein (b) further comprises:

(b-6) instructions to provide output to the user representing the computer-generated answer $C_Q$.

81. The method of claim 17, wherein the first region definition specifies a document type.

82. The method of claim 17, wherein the first region definition specifies a keyword.

83. The method of claim 17, wherein the first region definition specifies a relationship to a concept.

84. The method of claim 17, wherein the first region definition specifies a section type.

* * * * *

UNITED STATES PATENT AND TRADEMARK OFFICE
CERTIFICATE OF CORRECTION

PATENT NO. : 9,082,310 B2  Page 1 of 1
APPLICATION NO. : 13/025051
DATED : July 14, 2015
INVENTOR(S) : Koll et al.

It is certified that error appears in the above-identified patent and that said Letters Patent is hereby corrected as shown below:

In the Specification

In Column 5, Line 53, delete "corpus 102;" and insert -- corpus 102. --, therefor.

In Column 8, Line 16, delete "score 138a" and insert -- score 140a --, therefor.

In Column 8, Line 23, delete "score 138a" and insert -- score 140a --, therefor.

In Column 8, Line 24, delete "score 138a" and insert -- score 140a --, therefor.

In the Claims

In Column 19, Line 37, in Claim 42, delete "identify)" and insert -- identify --, therefor.

In Column 19, Line 52, in Claim 45, delete "region)" and insert -- region --, therefor.

Signed and Sealed this
Fifth Day of April, 2016

Michelle K. Lee
*Director of the United States Patent and Trademark Office*